Nov. 3, 1959 G. H. FATHAUER 2,911,561
AUTOMATIC TARGET CURRENT CONTROL CIRCUIT
Filed Aug. 11, 1954
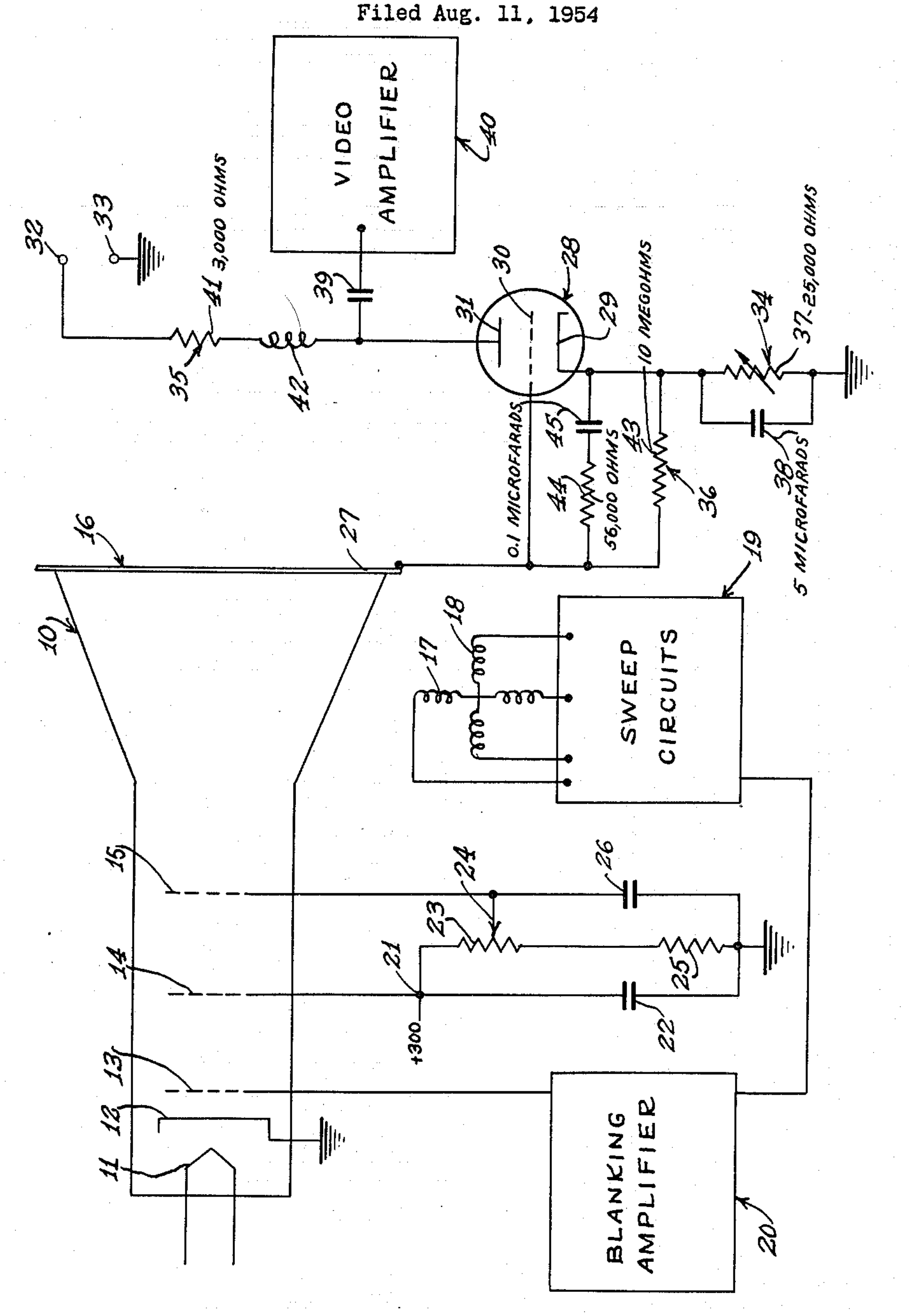
Inventor
GEORGE H. FATHAUER
by Hill, Sherman, Meroni, Gross & Simpson Attys.

United States Patent Office 2,911,561

Patented Nov. 3, 1959

2,911,561

AUTOMATIC TARGET CURRENT CONTROL CIRCUIT

George H. Fathauer, Decatur, Ill., assignor to Thompson Ramo Wooldridge Inc., a corporation of Ohio Application August 11, 1954, Serial No. 449,244

7 Claims. (Cl. 315—10)

This invention relates to an automatic target control circuit for television camera tubes or the like, but the basic principles of this invention have wide application in photo-electric circuits.

The invention is herein described and illustrated as applied to a television camera tube of a photo-conductive type. Such tubes are variously referred to as "Vidicon" tubes, "Staticon" tubes and "Resistron" tubes. In such a tube, a cathode ray beam scans a light-sensitive element on the inner surface of a glass face plate of the tube. The light-sensitive element may be visualized as consisting of two separate elements electrically: (1) a transparent conducting film coating on the inner surface of the glass face-plate and (2) a thin layer of photo conductive material on the scanning side. The transparent conducting film coating may be connected to a point at a positive potential relative to the cathode of the tube. Under no light conditions, the photo conductive layer is essentially an insulator exhibiting a very high resistance but with light on any point on the photo-conductive layer, the resistance will be decreased in proportion to the intensity of the light. With an image focused on the light-sensitive element and with the element being scanned by the cathode ray or electron beam, the current from the conducting film through the photo-conductive layer and through the beam to the cathode at any instant will be proportional to the light intensity at the point at which the beam is at the instant focused. The photo-conductive tube is thus a photo-electric device having a conductivity varying in accordance with light intensity.

To convert the varying light intensities to a correspondingly varying electrical signal, an impedance may be connected in series with the cathode-target path of the photo-conductive tube to form a series circuit which circuit may be connected across a source of voltage. As the conductivity of the tube is varied in accordance with varying light intensities, the voltage developed across such impedance (or across the tube itself) will vary as a function of the varying conductivity and hence as a function of the varying light intensity. The electrical signal thus produced is usually referred to as the video signal when the photo-electric device is used as a television camera tube.

With images focused on the target area of the tube of varying average light intensity but of the same relative contrast between light and dark areas, the amplitude of variations in current through the tube, and hence the amplitude of the video signal, will increase as the average light on the target is increased and decrease as the average light is decreased.

It is ordinarily desirable to obtain a video signal of maximum amplitude from the circuit and it has heretofore been the practice to obtain the greatest possible light intensity on the target and to manually adjust the circuit, if necessary, to obtain the necessary current through the tube. This practice has not been altogether satisfactory because it necessitates constant manual adjustment of either the light system for obtaining the image on the target or the circuit. Further, it is possible to damage the tube with excessive current through the light-sensitive element and in the hands of unskilled operators, damage to the tube is likely to happen.

According to this invention, the current through the photo-electric device (i.e. the current through the light sensitive element) is automatically limited to prevent damage to the light-sensitive element thereof. Preferably, the current through the photo-electric device is so automatically regulated as to maintain a substantially constant current through the device, so as to obtain a uniform signal output from the photo-electric circuit and so as to prevent damage to the light-sensitive element of the device at the same time. This regulation of the current is particularly important when the photo-electric device is a photo-conductive tube or the like used in a television camera, since it is highly desirable that the signal output from the circuit of such a tube be uniform and such a tube is subject to damage from excessive current so that it is highly desirable that the current therethrough be limited.

The current through the photo-electric device could be limited or regulated by regulating the light system used to impinge light on the light-sensitive element of the device. Most preferably, however, the current through the device is limited or regulated by controlling the voltage applied to a series circuit including the photo-electric device and the impedance in series therewith.

According to a specific feature of the invention, the current through the photo-electric device is controlled by means of a discharge device which may be a gaseous discharge device or a transistor but preferably the discharge device is a vacuum tube. The discharge device may have a cathode, a grid and an anode and, if desired, additional electrodes. To control the current through the photo-electric device, means may be provided responsive to current through the device for causing a change in the potential of the grid with reference to the cathode, the sense of the change being such as to cause application of increased voltage across the photo-electric device when the current therethrough is reduced.

In a preferred circuit arrangement, the anode and cathode of a discharge device are respectively connected to positive and negative circuit points with an impedance in the connection between the cathode and the negative circuit point. The photo-electric device is connected in series with a second impedance across the impedance in the cathode circuit, and the potential developed across such second impedance is applied in a circuit between the grid and cathode of the conduction device. Most preferably, such second impedance may be connected at one end to the cathode of the conduction device with the other end thereof connected to the grid, thus providing a very simple circuit for achieving the automatic control of current through the photo-electric device.

A further and highly important feature of the invention is in the use of a discharge device for both controlling the average current through a photo-electric device and amplifying varying signals produced by the device. In a preferred circuit arrangement incorporating this feature, the photo-electric device is connected in series with an impedance across an impedance in the cathode circuit of the discharge device with a voltage derived from the series circuit including the photo-electric device being applied between the grid and the cathode of the discharge device. Another impedance is connected in the plate circuit of the discharge device. To permit instantaneous variations in the current flow through the discharge device, while maintaining control of the average current through the device, a capacitor or the like may be connected across the impedance in the cathode circuit. The impedance in the plate circuit, however, may have a high impedance at frequencies up to the highest frequencies of desired signals obtained from the photo-electric device, and the voltage may be obtained across the plate impedance which is substantially larger than the voltage applied to the grid circuit of the discharge device.

To obtain effective control of the average current through the photo-electric device, it may be necessary to utilize a very high resistance in series therewith to obtain the desired voltage fluctuations from the fluctuating current through the photo-electric device. However, with such a large resistance, any stray capicitances in the circuit may greatly attenuate signals at higher frequencies desired to be transmitted, particularly when the photo-electric device is a camera pickup tube in a television system, in which case it may be desired to transmit signals of very high frequencies. According to a further feature of this invention, such a high resistance is connected in series with the photo-electric device to obtain effective control of the average current therethrough, but an impedance is connected in parallel with such high resistance, such impedance having a very high value with respect to direct currents and very low frequency signals but having a uniform value over the desired range of frequencies of operation.

An object of this invention, accordingly, is to provide an improved photo-electric circuit including means for automatically limiting or regulating the current through a photo-electric device.

Another object of this invention is to provide an improved photo-electric circuit in which a discharge device acts not only to limit or regulate current through a photo-electric device but also acts to amplify signals derived from the photo-electric device.

A further object of this invention is to provide an improved circuit for regulating the current flow through the light sensitive element of a photo-conductive television camera tube or the like.

Still another object of this invention is to provide an improved circuit which not only limits or controls the current flow through a photo-conductive television camera tube or the like but also efficiently amplifies video signals produced from the photo-conductive tube.

A still further object of this invention is to provide an improved photo-electric circuit which is very efficient and reliable in operation but is readily constructed from a minimum number of component parts.

This invention contemplates other objects, features and advantages which will become more fully apparent from the following detail description taken in conjunction with the accompanying drawing which illustrates a preferred embodiment and in which:

The single figure illustrates a preferred automatic target control circuit for a photo-conductive television camera tube or the like, incorporating the principles of this invention.

Reference numeral 10 designates a photo-electric device which may be a television camera pickup tube of a photo-conductive type. The tube 10 may comprise a heater 11 arranged to be connected to a suitable source of electricity (not shown) to heat a cathode 12 to a high temperature at which electrons may be emitted therefrom. Electrons emitted by the cathode 12 may pass successively through a control grid 13, an accelerator grid 14 and a focusing grid or electrode 15 toward a target 16. A coil (not shown) may be utilized in conjunction with the focusing electrode 15 to focus the electrons emitted by the cathode into a very narrow beam at the target 16. This beam may scan the target 16 under the control of deflection yokes 17 and 18 which may be energized by suitable sweep circuits 19, the sweep circuits 19 being interconnected with a blanking amplifier 20 connected to the control grid 13 to turn off the beam on retrace of the sweeps. The general operation of these circuits will be readily appreciated by those skilled in the art. The cathode 12 may be connected to ground and the accelerator grid 14 may be connected to a point 21 arranged for connection to a power supply to be at a relatively high positive, potential, for example, plus 300 volts, relative to ground. To prevent fluctuations in the potential of the point 21, a capacitor 22 may be connected between the point 21 and ground. To provide an adjustable potential for the focusing electrode 15, a potentiometer 23 having a movable contact 24 may be connected in series with a resistor 25 between the point 21 and ground with the contact 24 being connected directly to the focusing electrode 15 and also through a capacitor 26 to ground to prevent fluctuations in the potential of the electrode 15 relative to ground.

As previously described, the target 16 may comprise the glass face-plate of the tube 10 with a light-sensitive element comprising a transparent conducting film coating on the inner surface of the glass face-plate and a thin layer of photo conductive material on the scanning side of the film. The conducting film coating may be connected to a metal flange 27 to which suitable circuit connections may be made, as will be described. The conductivity of any point on the photo-conductive material with respect to the electron beam is dependent on the light intensity at that point. By applying a positive potential at the conducting film coating relative to the cathode 12, a varying current flow from the target through the electron beam to the cathode will be produced as the beam scans the target, which will indicate the image on the target. It will be understood, of course, that any suitable lens arrangement may be used to focus an image on the target 16.

It has been found that by limiting the current flow through the target, damage thereto can be obviated. It has been further found that by maintaining the current flow through the target substantially constant, a signal of uniform amplitude may be derived from the tube.

According to this invention, the current flow through the device 10 is limited and, preferably, the current flow is maintained at a substantially constant value. In accordance with a specific feature of the invention, this is accomplished through a discharge device 28 which may have a cathode 29, a grid 30 and a plate or anode 31. The device 28 may also have additional grids and electrodes if desired.

To supply power for operation of the circuit, a pair of circuit points 32 and 33 may be arranged for connection to positive and negative terminals of a power supply which may supply a relatively high voltage, for example, 200 volts. The negative point 33 may be connected to ground.

The cathode 29 may be connected through an impedance generally designated by reference numeral 34 to the negative circuit point 33, or ground, and the plate 31 may be connected through an impedance generally designated by reference numeral 35 to the positive circuit point 32. The photo-electric device 10 may be connected in series with an impedance 36 across one of the impedances 34 or 35, preferably the impedance 34 in the cathode circuit. This may be accomplished by connecting one side of the impedance 36 to the flange 27 of the target 16 with the other terminal thereof being connected to the cathode 29, and with the cathode 12 of the vidicon tube 10 being connected to ground, as previously described. It will be appreciated that with conduction of the device 28, a voltage will be developed across the impedance 34 which is applied across the series circuit including the vidicon tube 10 and the impedance 36.

To provide automatic regulation of the current through photo-conductive tube 10, that is, regulation of the current through the light sensitive element, a signal derived from the series circuit including the vidicon tube 10 may be applied between the cathode 29 and the grid 30 of the device 28, preferably by connecting the grid 30 directly to the flange 28 of the target 16, that is, the junction between the tube 10 and the impedance 36.

With this circuit arrangement, if the current through the tube 10 increases, the negative potential of the grid 30 relative to the cathode 29, or the bias of the device 28, will be increased to decrease the current flow through the impedance 34, to thus decrease the voltage developed across the impedance 34 and decrease the voltage applied to the series circuit including the tube 10 and impedance 36. This, of course, will reduce the current flow through the tube 10, and the circuit automatically operates to maintain the current flow at a substantially constant value.

Since it is desirable to obtain a signal output from the circuit varying in accordance with light intensity, the automatic control circuit should not operate instantaneously but should operate only to maintain a constant average current flow through the tube 10. For this reason, the impedance 34 should have a very low impedance at the frequencies of the desired signals but should have a high impedance to direct current or very low frequency currents. The impedance 34 may therefore comprise a resistor 37 and a capacitor 38 in parallel therewith.

According to an important feature of the invention, the device 28 operates not only to automatically maintain a constant average current through the tube 10 (i.e., through the light sensitive element or target) but also serves as a means for amplifying signals derived from the tube 10. For this purpose, the impedance 35 in the plate circuit of the device 28 may have a substantial impedance to currents at the frequencies of the desired signals and the voltage developed across this impedance may be coupled, as through a capacitor 39 to a utilization circuit such as a video amplifier 40. The impedance 35 may comprise a resistor 41 in series with a suitable peaking inductor 42.

In order to obtain effective regulation of the average current through the device 10, the impedance 36 should have a relatively high value. However, if the impedance 36 has such a high value, the reactance of inherent stray capacitances in the circuit may be comparable with and possibly less than the value of the impedance 36 so that signals of lower frequencies will have much higher amplitudes than signals of higher frequencies. It is therefore desirable that the impedance 36 should have a relatively high value with respect to direct current, or very low frequency currents, and a relatively low value with respect to currents at the desired signal frequencies.

The impedance 36 may therefore preferably comprise a resistor 43 having a relatively high value with a resistor 44 having a relatively low value connected in series with a capacitor 45 across the resistor 43.

By way of illustrative example and not by way of limitation, the resistor 37 may have a resistance of 25,000 ohms, the capacitor 38 may have a capacitance of 5 microfarads, the resistor 41 may have a resistance of 3000 ohms, the resistor 43 may have a resistance of 10 megohms, the resistor 44 may have a resistance of 56,000 ohms, and the capacitor 45 may have a capacitance of 0.1 microfarad.

It will be therefore readily appreciated that this invention provides an extremely simple and readily constructed circuit arrangement using a minimum number of component parts for achieving current control and signal amplification from a photo-electric device, this arrangement being especially advantageous when used in combination with a television camera tube in the form of a photo-conductive tube or the like.

It will be understood that modifications and variations may be effected without departing from the spirit and scope of the novel concepts of the present invention.

I claim as my invention:

1. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, means connecting said first and second electrodes to said output terminals including a first impedance arranged to substantially by-pass alternating current components, a second impedance, means including said second impedance connecting said cathode and said target to opposite ends of said first impedance to provide a series circuit, and means applying a voltage derived from said series circuit between said first and third electrodes in a manner such that said control device operates to oppose variations in the average target current.

2. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, means connecting said first and second electrodes to said output terminals including a first impedance arranged to substantially by-pass alternating current components, a second impedance, means including said second impedance connecting said cathode and said target to opposite ends of said first impedance to provide a series circuit, and means applying a voltage derived from said series circuit between said first and third electrodes in a manner such that said control device operates to oppose variations in the average target current, said second impedance having a relatively high value with respect to direct and very low frequency currents and having a relatively low value with respect to the currents of the desired signal frequency.

3. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, means connecting said first and second electrodes to said first and second output terminals including first and second impedances, a third impedance, means connecting said third impedance in series with the cathode-target circuit of said camera pick-up tube across said first impedance, means for applying a voltage between said third electrode and said first electrode varying substantially instantaneously in accordance with currents through said cathode-target circuit of said camera pick-up tube, and means for coupling the voltage across said second impedance to a video amplifier.

4. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, means connecting said first and second electrodes to said first and second output terminals including first and second impedances, a third impedance, means connecting said third impedance in series with the cathode-target circuit of said camera pick-up tube across said first impedance, means for applying a voltage between said third electrode and said first electrode varying substantially instantaneously in accordance with currents through said cathode-target circuit of said camera pick-up tube, and means for coupling the voltage across said second impedance to a video amplifier, said first impedance having a relatively high value with respect to direct and very low frequency current and a relatively low value with respect to currents of the desired signal frequencies, and said second impedance having a relatively high value with respect to currents of signal frequencies.

5. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, a first resistor connecting said first electrode to said first output terminal, means connecting said second electrode to said second output terminal, a second resistor connected between said target and said first electrode, means connecting said target to said third electrode, and means connecting said cathode to said direct current supply.

6. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, a first resistor connecting said first electrode to said first output terminal, impedance means connecting said second electrode to said second output terminal, a first capacitor connected across said first resistor to by-pass alternating current components, a second resistor connected between said target and said first electrode, means connecting said target to said third electrode, means connecting said cathode to said direct current supply, and means for connecting said second electrode to a video amplifier input.

7. In a television camera, a camera pick-up tube having a cathode and a target scanned by a cathode ray beam from said cathode with the impedance of the path between said target and said cathode varying in accordance with light intensity on the portion of said target impinged by the beam, a control device having first, second and third electrodes with the effective impedance between said first and second electrodes being controlled in accordance with the voltage applied between said third electrode and said first electrode, a direct current power supply having first and second output terminals, a first resistor connecting said first electrode to said first output terminal, impedance means connecting said second electrode to said second output terminal, a first capacitor connected across said first resistor to by-pass alternating current components, a second resistor connected between said target and said first electrode, means connecting said target to said third electrode, means connecting said cathode to said direct current supply, means for connecting said second electrode to a video amplifier input, a third resistor, a second capacitor connected in series with said third resistor across said second resistor, said third resistor having a resistance substantially lower than the value of said second resistor.

References Cited in the file of this patent

UNITED STATES PATENTS

| | | |
|---|---|---|
| 2,086,964 | Shepard | July 13, 1937 |
| 2,177,736 | Miller | Oct. 31, 1939 |
| 2,401,458 | Buckbee | June 4, 1946 |
| 2,786,960 | Palmer | Mar. 26, 1957 |